United States Patent [19]

Twerdochlib et al.

[11] Patent Number: 5,146,776
[45] Date of Patent: Sep. 15, 1992

[54] METHOD FOR CONTINUOUSLY CALIBRATING AN OPTICAL VIBRATION SENSOR

[75] Inventors: Michael Twerdochlib, Oviedo; Richard B. Chianese, Altamonte Springs, both of Fla.

[73] Assignee: Westinghouse Electric Corp., Pittsburgh, Pa.

[21] Appl. No.: 618,135

[22] Filed: Nov. 26, 1990

[51] Int. Cl.$^5$ .................. G01D 18/00; G01N 29/22; G01N 29/12
[52] U.S. Cl. .................. 73/1 DV; 73/579; 73/657; 73/660; 364/571.02
[58] Field of Search ........... 73/1 DV, 1 R, 657, 660, 73/579, 584, 587, 658, 661; 364/571.01–571.08

[56] References Cited

U.S. PATENT DOCUMENTS

| | | | |
|---|---|---|---|
| 2,384,716 | 9/1945 | Wengel | 73/579 |
| 3,277,695 | 10/1966 | Joline | 73/660 X |
| 3,550,107 | 12/1970 | Thompson et al. | 73/660 X |
| 3,783,680 | 1/1974 | Mason | 73/654 |
| 4,039,767 | 8/1977 | Leschek | 73/1 DV |
| 4,419,897 | 12/1983 | Matsuoka | 73/660 |
| 4,823,601 | 4/1989 | Barna | 73/657 X |
| 4,896,537 | 1/1990 | Osborne | 73/660 |
| 4,977,516 | 12/1990 | Shepherd | 73/660 X |
| 5,069,071 | 12/1991 | McBrien et al. | 73/579 X |

FOREIGN PATENT DOCUMENTS

| | | | |
|---|---|---|---|
| 313022 | 12/1988 | Japan | 73/660 |
| 721679 | 3/1980 | U.S.S.R. | 73/657 |
| 868368 | 10/1981 | U.S.S.R. | 73/660 |
| 1516822 | 10/1989 | U.S.S.R. | 73/579 |
| 1516953 | 10/1989 | U.S.S.R. | 73/1 DV |

*Primary Examiner*—Tom Noland

[57] ABSTRACT

An optical vibration sensor is automatically calibrated by extracting a beat frequency vibration signal from a vibration signal produced by the optical vibration sensor, computing a resonant frequency of the optical vibration sensor using the beat frequency which has been extracted, and calibrating the optical vibration sensor based on the resonant frequency computed. The calibration method continuously compensates for changes in the resonant frequency due to temperature and mechanical changes of the optical vibration sensor. The optical vibration sensor is physically attached to an end-winding of an electrical generator.

15 Claims, 6 Drawing Sheets

METHOD FOR CONTINUOUSLY CALIBRATING AN OPTICAL VIBRATION SENSOR

BACKGROUND OF THE INVENTION a. Field of the Invention

The present invention is directed towards a method for continuously calibrating an optical vibration sensor and, more particularly, to a calibration technique which continuously compensates for changes in the resonant frequency of the optical vibration sensor due to temperature and mechanical changes of the optical vibration sensor.

b. Description of the Related Art

Generator end-windings producing 60 hertz (Hz) electrical current, continuously vibrate at 120 Hz. Generator end-winding vibration has been effectively monitored using fiber optic technology with end-turn vibration monitoring systems. The end-turn vibration monitoring systems utilize optical vibration sensors and a monitoring system to convert light pulses into a measured vibration amplitude. Optical vibration sensors are required because of the high electric potential, e.g., approximately 20 Kilovolts, associated with the generators. The capability to monitor stator end-winding vibration levels during operation provides for the identification of changes occurring within the generator, thus allowing the opportunity for early correction of damaging conditions before extensive winding repairs or replacement are necessitated. Further, the information obtained by vibration monitoring can be compiled over a period of time and compared with other data, thus permitting in-depth assessment of the generator's current condition, and allowing enhanced maintenance planning.

A problem exists in that the optical vibration sensors of the prior art are not easily calibrated. That is, the vibration sensors suffer from a significant temperature drift causing a change in the resonant frequency of the vibration sensors which causes inaccurate measurement of the vibration amplitude. These optical vibration sensors are available, for example, from the Westinghouse Corporation located in Orlando, Fla. as Model 9299A43. These type of sensors include an internal reed which vibrates a grid assembly. These grid assemblies are typically etched using the same photographic techniques used to produce integrated circuit chips.

Not only are the vibration sensors affected by changes in temperature, but the sensors are also affected by metal fatigue or loss of mass. For example, the internal reed of the vibration sensor starts to fatigue after several million cycles. As a result, the resonant frequency changes as the elastic parameter of the internal reed changes. Also, a loss of mass could occur if a small piece of metal, solder, epoxy or the like used to construct the vibration sensor were to fall off or become separated from the internal reed or grid assembly of the vibration sensor.

The prior art technique for compensating for changes in temperature is to calibrate the vibration sensor at the average temperature at which the vibration sensor will be used. This approach is somewhat effective but requires recalibration when changing environments. Further, the actual vibration magnitude obtained using the known calibration technique suffers from a loss of accuracy. Further, known calibration techniques cannot compensate for metal fatigue, temperature change from the average temperature, loss of mass or the like.

SUMMARY OF THE INVENTION

It is an object of the present invention to provide a method for continuously calibrating an optical vibration sensor to automatically compensate for temperature and mechanical changes of the vibration sensor.

It is also an object of the present invention to extend the useful life of optical vibration sensors.

It is a further object of the present invention to provide a method which more accurately measures the vibration levels of generator end-windings.

The above objects can be accomplished by a method for calibrating an optical vibration sensor which is physically attached to a generator by extracting a beat frequency vibration signal from a vibration signal produced by the optical vibration sensor; computing a resonant frequency of the optical vibration sensor using the beat frequency which has been extracted; and calibrating the optical vibration sensor based on the resonant frequency computed. Thus, the present invention provides automatic calibration of the optical vibration sensor based on continuous measurements of the beat frequency of the optical vibration sensor. These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
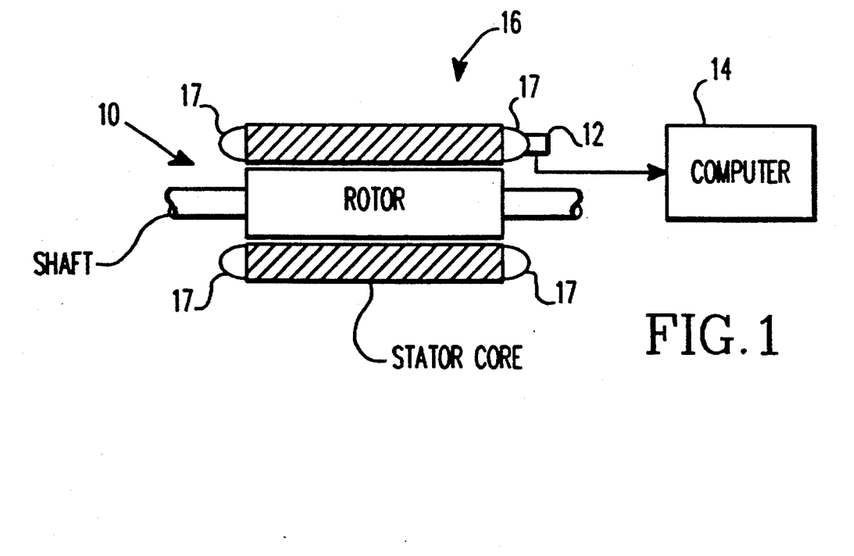
FIG. 1 is a structural diagram of a vibration sensing system illustrated with a cross section of a generator.

A vibration sensing system is illustrated in FIG. 1. In FIG. 1, generator 10, optical vibration sensor (OVS) 12 and computer 14 constitute the vibration sensing system 16. By measuring the vibration amplitude of a generator end-winding, one can detect troublesome conditions of the generator at an early stage. This allows maintenance to be scheduled prior to damage to the generator, thus minimizing down time and unnecessary damage to the generator end-winding components.

The optical vibration sensor 12 is mounted directly to the end-winding 17 of the generator 10 in the direction in which vibration is to be measured. Preferably, a plurality of vibration sensors are positioned around the end-windings of the generator. By using a plurality of vibration sensors, the vibration of the generator can be correctly monitored even if one or more of the vibration sensors happens to be sitting at a node (an effectively stationary point) of the vibration mode. Precise symmetrical spacing is not required. Namely, convenient spacing around the end-turn basket of the stator windings of the generator is normally sufficient. For example, twelve sensors can be used for each generator, with six sensors at the exciter-end and six at the turbine-end.

The massive exciter-end and turbine-end end-turns of the generators are consolidated into semi-ridged baskets to prevent damaging effects of the 120 Hz vibration coupled into the system from the rotor field. The optical vibration sensor monitors the end-turn vibration to provide warning signals that destructive levels of vibration exist or that the vibration level is increasing. The vibration may then be controlled through load management or change in coolant gas temperature until an outage can be scheduled for the particular generator. Then, the end-turn basket can be repaired and returned to service.

Figure 2:
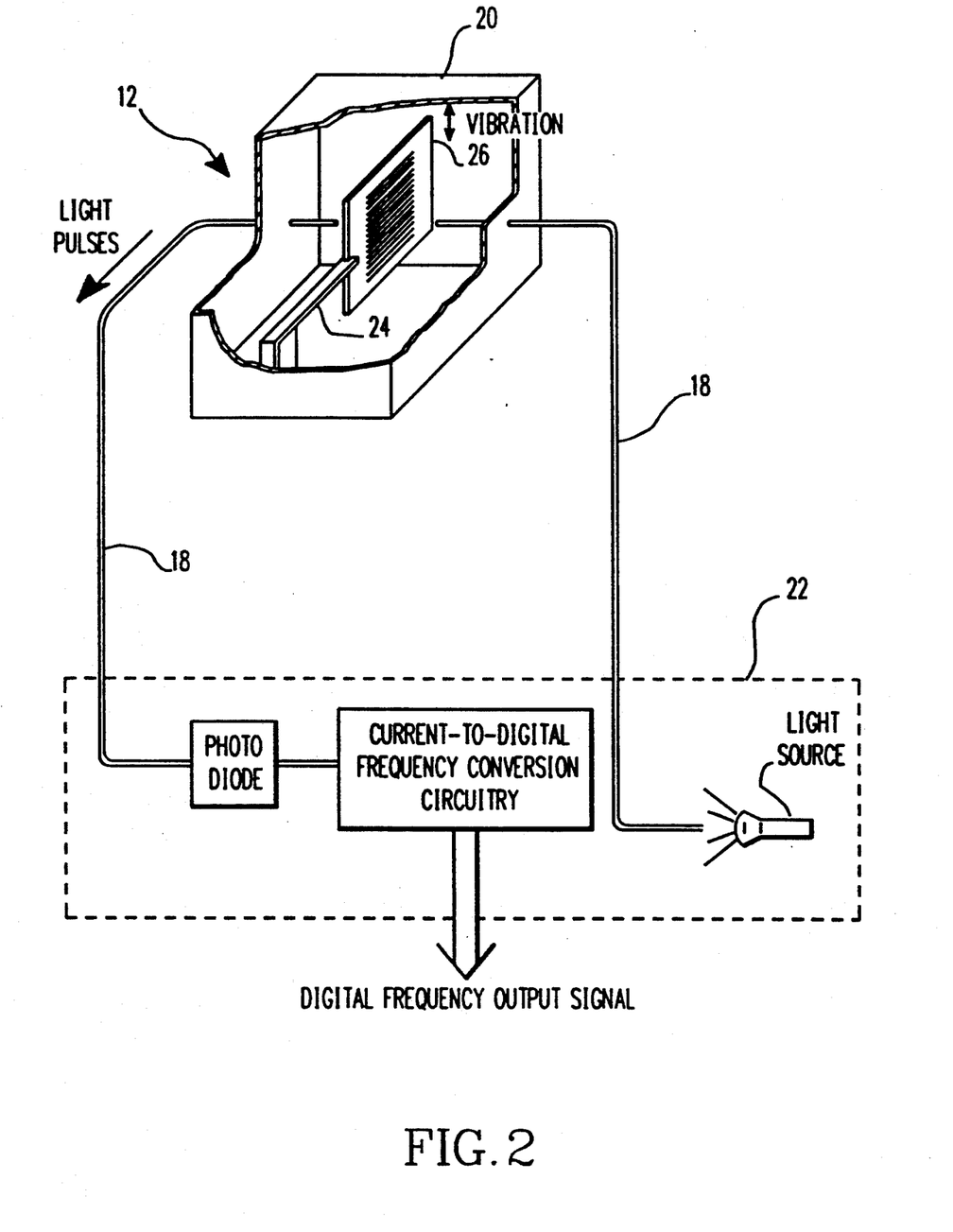
FIG. 2 is a schematic diagram of an optical vibration sensor.

FIG. 2 illustrates the optical vibration sensor 12 in more detail. The optical vibration sensor 12 receives light from an optical fiber cable 18. The optical vibration sensor includes a housing 20 and an optical-to-digital conversion unit 22. The housing 20 includes an internal reed 24 and a grid assembly 26. The grid assembly 26 is located at the end of the internal reed 24. The internal reed 24 and the grid assembly 26 have a resonant frequency above 120 Hz. Preferably, the resonant frequency is approximately 132 Hz for a 60 Hz generator application. In the United States, electric generators produce 60 Hz electrical power which produces mechanical vibrations in the end-windings at 120 Hz, while in Europe a 50 Hz electrical cycle is used which produces mechanical vibrations in the end-windings at 100 Hz. The following discussion assumes the generator is producing 60 Hz electrical power, although the principles are the same for a 50 Hz unit.

As the internal reed vibrates, the grid assembly 26 moves up and down (in tho direction shown by the arrow in FIG. 2) causing light pulses to be produced. The number of light pulses produced in a given time interval is proportional to the amplitude of the 120 Hz vibration being measured (100 Hz in Europe). The grid assembly 26 has evenly spaced grid openings which are separated by 10 mils. The light pulses are output from the casing 20 through the optical fiber cable 18 to the optical-to-electrical conversion unit 22. The optical-to-electrical conversion unit 22 converts the light pulses into a digital signal according to a conventional method. For example, a photo diode can be utilized to convert the light pulses to an electrical signal which can then be converted into a digital frequency output signal.

Figure 3:
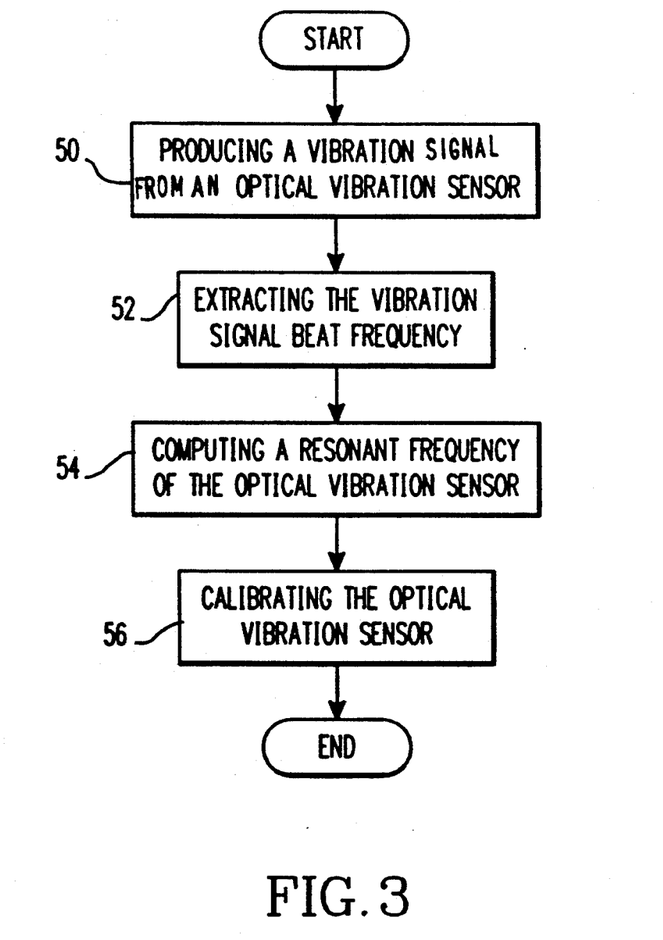
FIG. 3 is a flowchart illustrating the basic calibration method according to the present invention.
Figure 4:
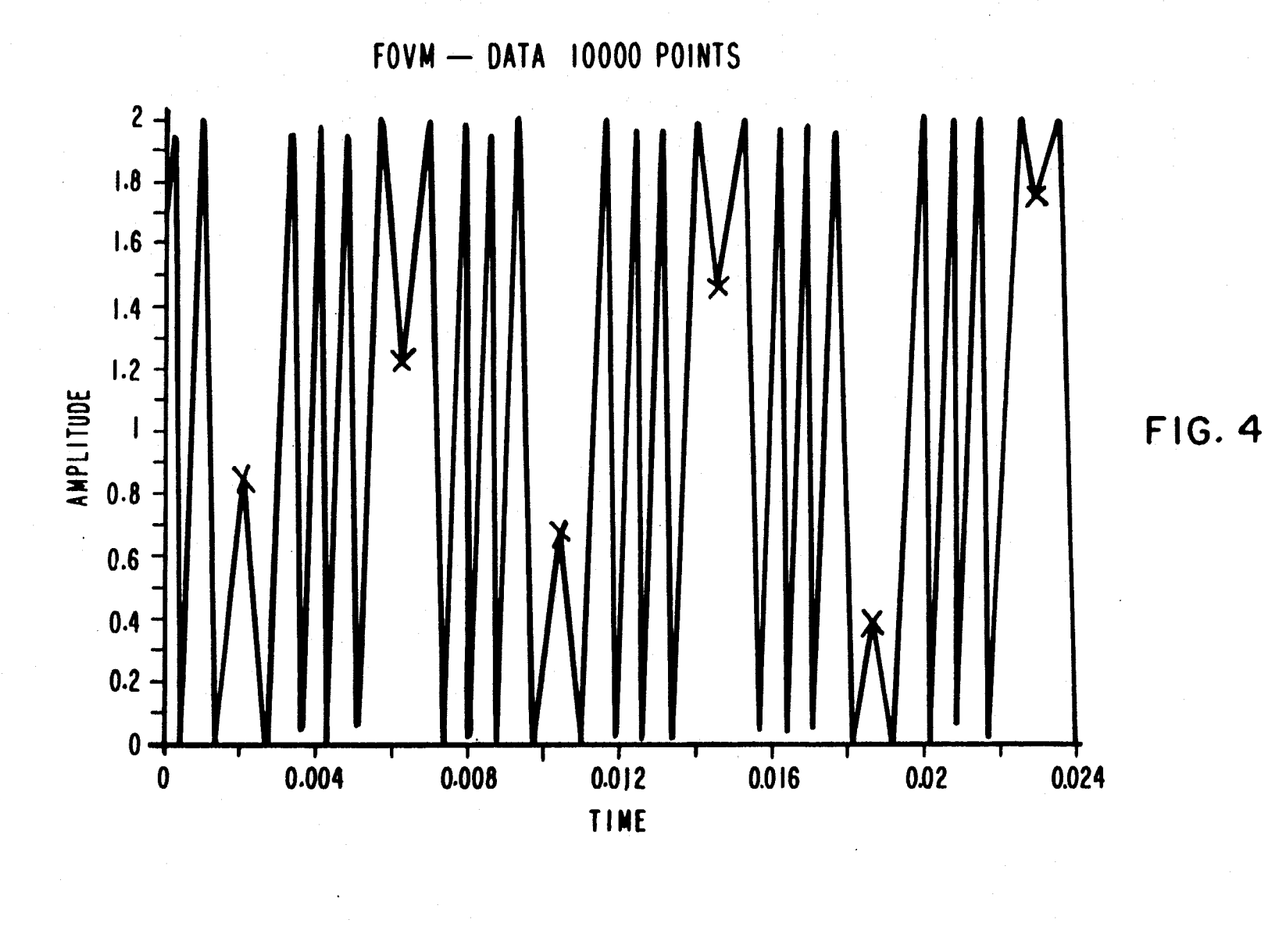
FIG. 4 is a graph illustrating an example of a vibration signal from an optical vibration sensor.
Figure 5:
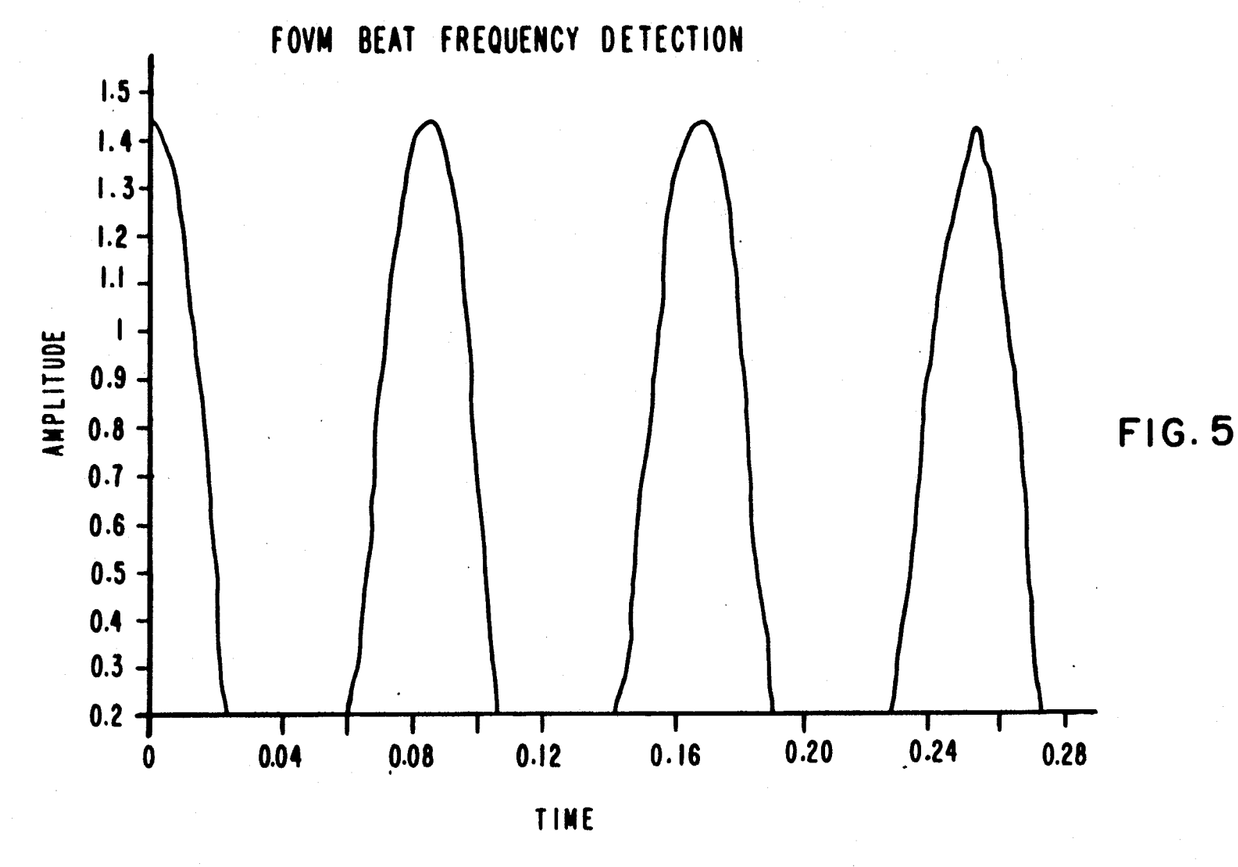
FIG. 5 is a graph illustrating an example of a beat frequency vibration signal.

FIG. 3 is a flowchart illustrating the basic calibration method according to the present invention. In step 50, a vibration signal from an optical vibration sensor is received. An example of a vibration signal obtained from an optical vibration sensor is illustrated in FIG. 4. In step 52, the vibration signal beat frequency is extracted from the vibration signal obtained from the vibration sensor 12. An example of an extracted beat frequency vibration signal is illustrated in FIG. 5. FIG. 4 illustrates pulses obtained from the optical-to-electrical conversion unit 22. Namely, FIG. 4 illustrates the amplitude of the vibration of the generator based on the number of pulses per unit time which correspond to the number of full slit openings that pass the light beam per unit time. By counting the number of pulses obtained in a given period of time, one can easily compute the amplitude of the vibration.

Further, the graph illustrated in FIG. 4 illustrates partial slit passages. Partial slit passages occur at the extreme of the reed displacement when a complete pass of the width of a particular slit through the light beam within the grid assembly 26 does not occur. A slow change in partial pulses result from ambient vibration that causes the grid assembly 26 to also vibrate slightly at its resonant frequency. However, the amplitude of the ambient vibration is very small. Therefore, the effect ambient vibration has on the light pulses is that the last slit will travel slightly further (or less far) into the light beam. As a result, the resonant frequency of the optical vibration sensor 12 which is excited by the ambient vibration will cause the grid assembly 26 to go slightly higher or slightly lower at a beating frequency. Hence, the partial pulses only appear when the vibration causes a grid slit to partially but not completely cross the light beam. In this case, a clipping of the light pulse occurs, i.e., a partial transmission of the light pulse occurs.

The extreme of the slit motion of the partial pulses of grid motion are illustrated in FIG. 4 by an X. These extreme of the slit motion occur at the peak amplitudes of the partial pulses. The partial pulses from the downward direction can be inverted and included as partial pulse information, if desired, as discussed below. The beat frequency vibration signal is then extracted from the vibration signal by calculating the frequency of the sine wave which results from connection of the peak amplitudes of the partial pulses.

As illustrated in FIG. 4, the beat frequency vibration signal is a partial sine wave. The frequency of this partial sine wave can be obtained by a number of conventional techniques. Preferably, the data is curve fit to a sine function, such as $\sin(2\pi f_b t)$. Programs which perform curve fitting can be found in most, if not all, numerical analysis texts.

The beat frequency vibration signal $f_b$ is used to complete 54 the resonant frequency $f_o$ of the optical vibration sensor according to the following equation:

$$f_o = 120Hz + f_b \quad (1)$$

where $f_o$ and $f_b$ are in units of Hertz (Hz). That is, the resonant frequency $f_o$ can be obtained by adding 120 Hz to the beat frequency $f_b$. For example, the beat frequency illustrated in FIG. 5 is 12 Hz, thus yielding a sensor resonant frequency of 132 Hz.

Once the resonant frequency of the optical vibration sensor is obtained, the optical vibration sensor 12 can be calibrated 56. To calibrate the optical vibration sensor 12, the amplification by the optical vibration sensor 12 of the 120 Hz vibrations must be computed. The amplification factor $M_o$ of the optical vibration sensor 12 for the 120 Hz signal can be obtained according to the following equation:

$$M_0 = \frac{(120/f_0)^2}{1 - (120/f_0)^2} \quad (2)$$

Note that equation (2) assumes that the resonant frequency is offset far enough from 120 Hz so that the Q-dependence of the optical vibration sensor 12 at 120 Hz can be assumed to be zero. The Q-dependence is only important when the generator end-winding vibrations are very near the resonant frequency (e.g., 132 Hz).

In equation (2), the distance from which the 120 Hz signal is removed from the resonant frequency of the optical vibration sensor 12 affects the amplification factor. Specifically, with a 132 Hz resonant frequency the amplification factor is roughly 5½ at 120 Hz. To obtain the actual displacement of the generator due to vibration at 120 Hz, the measured amplitude must be divided by the amplification factor. Note that equation (2) results from the correlation between light pulse frequency and amplitude of the grid which can be expressed as:

$$\text{Amplitude of vibration} = f_{LP} \times 1 \text{ mil}/180 \text{ Hz} \qquad (3)$$

where $f_{LP}$ is the light pulse frequency in Hertz. This equation is associated with the grid assembly 26 having a grid spacing of 10 mils.

Figure 6A:
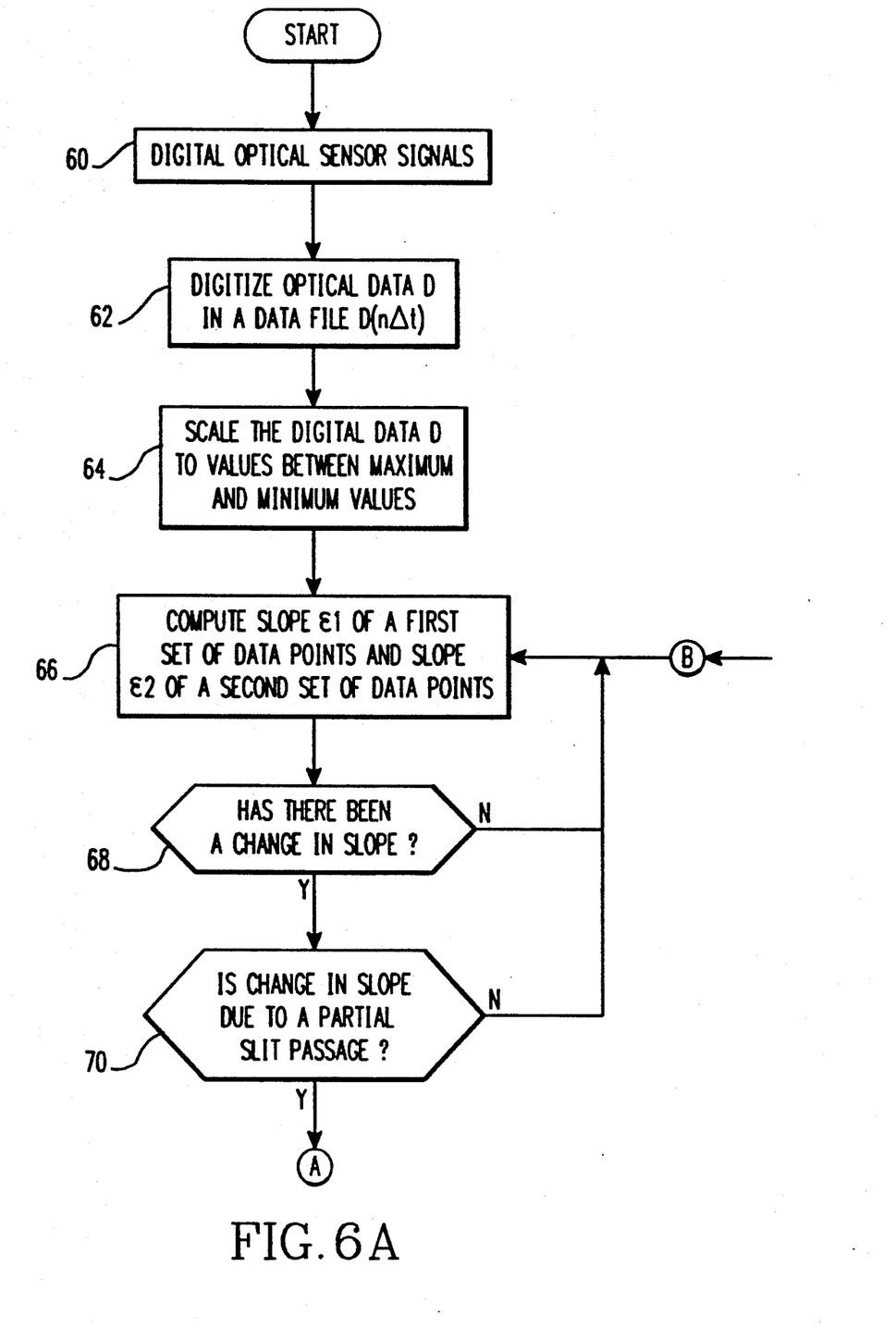
FIGS. 6(A) and 6(B) are flowcharts illustrating the processing utilized by the present invention to extract a beat frequency from a vibration signal.
Figure 6B:
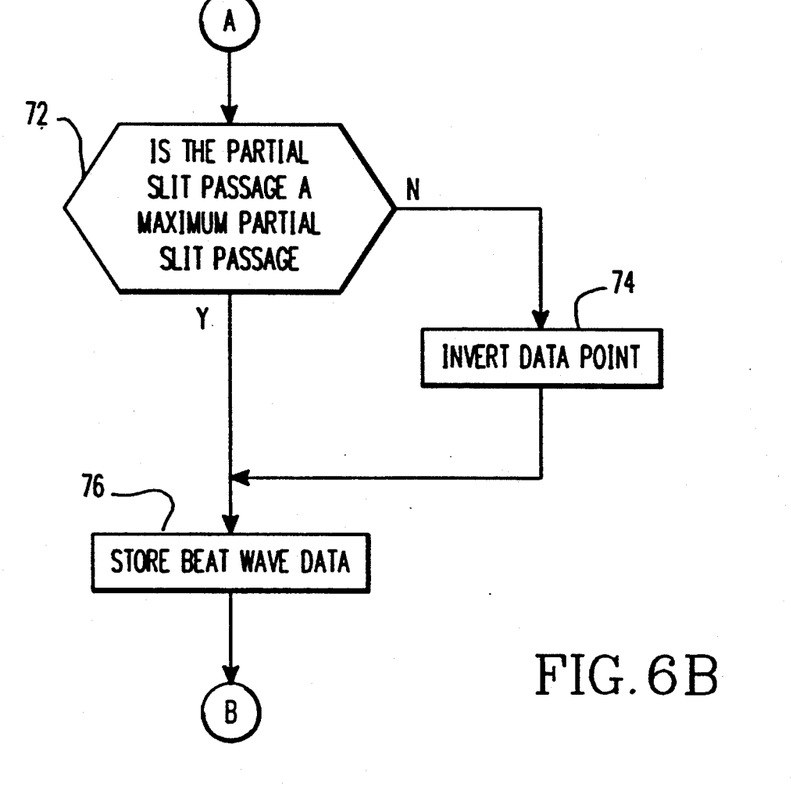

FIGS. 6(A) and 6(B) are flowcharts which illustrate the processing of step 52 of FIG. 3 in further detail. That is, FIGS. 6(a) and 6(b) illustrate an embodiment of a method for extracting the beat frequency from the vibration signal received from an optical vibration sensor. First, the vibration signal from the optical vibration sensor is digitized 60. This is accomplished, for example, at least in part by the optical-to-electrical conversion unit 22 illustrated in FIG. 2. Namely, the vibration signal which is an optical signal is converted into an electrical signal using a photo-diode, then a digital signal is produced by digitizing the electrical signal using a standard analog-to-digital converter. Digital data D generated in step 60 is stored 62 in a data file D(nΔt).

Next, the digital data D is scaled 64 to provide a convenient range of values between maximum and minimum values. This can be achieved, for example, by using a 80286 microprocessor manufactured by Intel Corporation of Santa Clara, Calif. For example, in FIG. 4, the digital data D has been scaled to values between 0 and 2. First and second slopes ε1, ε2 are calculated 66 from the scaled digital data. The first slope ε1 is calculated using the first two data points retrieved from the data file D(nΔt), while the second slope ε2 is obtained using the third and fourth data points retrieved from the data file D(nΔt). As an example, the first slope ε1 can be calculated using the following equation $$\epsilon 1 = D((n+1)\Delta t) - D((n)\Delta t) \qquad (4)$$

while the second slope ε2 is calculated using the following equation $$\epsilon 2 = D((n+2)\Delta t) - D((n+1)\Delta t) \qquad (5)$$

where the index n is initially set to 1. Thereafter, the index n is incremented by 1 (or 2) when the next slope is to be calculated from the next available data points which are sequentially stored in the data file D(nΔt).

Next, the method determines 68 whether there has been a change in slope from the first slope ε1 to the second slope ε2. If not, the slope is computed 66 using subsequent data points. If there has been a change in slope, the processing moves to step 70.

In step 70, the method determines if the change in slope is due to a partial slit passage. If not, slope of the next two data points is computed 66. To detect a partial slit passage, one technique is to mask off any full slit passages. This can be achieved by designating all changes in slope as full slit passages which occur within 15% of either the maximum value or the minimum value. For example, with the maximum values set at 2 and the minimum value set at 0, if $D((n+1)\Delta t) \leq 0.30$ or $D((n+1)\Delta t) \geq 1.70$ then the processing is directed to computation 66 of slope using subsequent data points. Note, however, that as illustrated in FIG. 4 an occasional partial pulse will be excluded by this technique. For example, if a partial pulse happens to have an amplitude which falls within 15% of either the maximum or minimum value, then this pulse will be excluded from consideration. The exclusion of these occasional partial pulses does not substantially affect the performance of the process. Furthermore, if one desired one could use conventional techniques to produce an algorithm for distinguishing partial pulses of this type from the full slit passages occurring in the same region.

As illustrated in FIG. 6(B), when the change in slope is due to a partial pulse, it is determined 72 whether the partial slit passage is a maximum partial slit passage or a minimum partial slit passage. A maximum partial slit passage occurs when a slit fully passes light and then goes a bit further. In contrast, a minimum partial slit passage occurs when the grid completely blocks light and then goes a bit further. If the partial slit passage is a minimum partial slit passage, then the data point is inverted 74. This can be achieved by subtracting the first data point of the second slope ε2 from the maximum value. For example, equation (6) can be used to find a new value for the data point when the maximum value is 2.

$$2 - D((n+1)\Delta t) \qquad (6)$$

Note that the minimum partial slit passages could be avoided altogether, thus eliminating the inversion 74. However, available data which is useful in obtaining the beat frequency would be lost.

If the partial slit passage is determined 72 to be a maximum slit passage and after inversion 74 when the partial slit passage is a minimum partial slit passages, an ordered pair of data corresponding to a beat wave is stored 76. That is, beat data B(j) is directly stored based on equation (7)

$$B(j) = D((n+1)\Delta t) \qquad (7)$$

or as inverted by step 74. Also stored is a timing index T(j) calculated according to equation (8)

$$T(j) = (n+1)\Delta t \qquad (8)$$

for each beat wave point indicating the relative position of the beat data B(j) with respect to time.

After storing 76 the beat data B(j) and timing index T(j), the slope of a new set of points is computed 66 and the process is repeated until all of the subsequent data points have been processed by this method. The end of this process of extracting the beat frequency can be detected by testing for the end of the data file D(nΔt) after the beat data is stored in step 76. Alternatively, if the number of data points stored is previously known, then one can simply terminate the processing by checking to see if the number of data points processed equals the number of data points stored.

After all the data has been processed, the beat data order pairs consisting of the amplitude value and the relative time position can be used to extract 52 the beat frequency vibration signal. As mentioned above, the beat frequency can be obtained by a conventional curve fitting technique. Plotting the extracted beat frequency data would result in a graph similar to FIG. 5.

The many features and advantages of the present invention are apparent from the detailed specification and thus it is intended by the appended claims to cover all such features and advantages of the method which fall within the true spirit and scope thereof. Further, since numerous modifications and changes will readily occur to those skilled in the art, it is not desired to limit the invention to the exact construction and operation illustrated and described, accordingly, all suitable modifications and equivalents maybe resorted to as falling within the scope and spirit of the invention.

What is claimed is:

1. A method for calibrating a vibration sensor attached to equipment, comprising the steps of:
   (a) obtaining a vibration signal, corresponding to vibration of the equipment, from the vibration sensor;
   (b) extracting a beat frequency vibration signal having a beat frequency from the vibration signal obtained in step (a);
   (c) computing a resonant frequency of the vibration sensor in dependence upon the beat frequency extracted in step (b); and
   (d) calibrating the vibration sensor in dependence upon the resonant frequency computed in step (c).

2. A method as recited in claim 1, wherein the vibration signal obtained in step (a) includes partial pulses, and
   wherein said extracting in step (b) comprises the step of calculating the beat frequency based on the partial pulses.

3. A method as recited in claim 1, wherein the equipment is an electrical generator having a 120 Hz end-turn vibration, and
   wherein the vibration signal obtained in step (a) includes a mechanical vibration signal resulting from the 120 Hz end-turn vibration of the electrical generator and the resonant frequency of the vibration sensor.

4. A method as recited in claim 1, wherein the vibration sensor is an optical vibration sensor having a grid assembly having a plurality of grids separated by slits,
   wherein said obtaining in step (a) comprises the steps of:
   (a1) passing a light beam through the grids of the grid assembly;
   (a2) vibrating the grid assembly in accordance with the vibration of the equipment;
   (a3) producing light pulses corresponding to the vibration of the equipment; and
   (a4) converting the light pulses into the vibration signal.

5. A method as recited in claim 4, wherein the equipment is a generator, and
   wherein the vibration signal is an electrical signal.

6. A method as recited in claim 4,
   wherein the light pulses produced in step (a3) include full slit passage pulses and partial slit passage pulses, and
   wherein said extracting in step (b) comprises the steps of:
   (b1) detecting a plurality of the partial slit passage pulses;
   (b2) extracting data points from the vibration signal corresponding to the partial slit passage pulses detected in step (b1); and
   (b3) calculating the beat frequency based on the data points.

7. A method as recited in claim 6, wherein the equipment is an electrical generator having a 120 Hz end-turn vibration, and
   wherein the vibration signal obtained in step (a) includes a mechanical vibration signal resulting from the 120 Hz end-turn vibration of the electrical generator and the resonant frequency of the vibration sensor.

8. A vibration sensing system for equipment, comprising:
   vibration sensor means, attached to the equipment, for producing a vibration signal in dependence upon vibration of the equipment; and
   control means for calibrating said vibration sensor means by extracting a beat frequency vibration signal having a beat frequency from the vibration signal produced by said vibration sensor means, computing a resonant frequency of said vibration sensor means in dependence upon the beat frequency, and calibrating the vibration sensor based on the resonant frequency.

9. A system as recited in claim 8, wherein the equipment is an electrical generator having a 120 Hz end-turn vibration, and
   wherein the vibration signal includes a mechanical vibration signal resulting from the 120 Hz end-turn vibration of the electrical generator and the resonant frequency of the vibration sensor.

10. A system as recited in claim 8, wherein said vibration sensor means comprises:
    pulse generating means for producing light pulses corresponding to the vibration of the equipment; and
    conversion means for converting the light pulses into the vibration signal.

11. A system as recited in claim 10,
    wherein the light pulses produced by said pulse generating means include full slit passage pulses and partial slit passage pulses, and
    wherein said control means comprises:
    partial pulse detecting means for detecting a plurality of the partial slit passage pulses;
    data point extracting means for extracting data points from the vibration signal corresponding to the partial slit passage pulses detected by said detection means; and
    beat frequency calculation means for calculating the beat frequency based on the data points.

12. A system as recited in claim 11, wherein said pulse generating means includes a grid assembly having a plurality of grids separated by slits.

13. A system as recited in claim 11, wherein the predetermined vibration frequency is one of 120 Hz and 100 Hz.

14. A system as recited in claim 11, wherein the equipment is an electrical generator, the electrical generator producing an electrical signal of a standard cycle, and
    wherein the vibration sensor means is an optical vibration sensor.

15. A system as recited in claim 11, wherein the equipment is an electrical generator having a 120 Hz end-turn vibration, and
    wherein the vibration signal includes a mechanical vibration signal resulting from the 120 Hz end-turn vibration of the electrical generator and the resonant frequency of the vibration sensor.

* * * * *